United States Patent [19]
Jones

[11] Patent Number: 5,137,299
[45] Date of Patent: Aug. 11, 1992

[54] ACTIVE SUSPENSION SYSTEM

[75] Inventor: Neil Jones, Palm City, Fla.

[73] Assignee: TRW Inc., Lyndhurst, Ohio

[21] Appl. No.: 692,207

[22] Filed: Apr. 26, 1991

[51] Int. Cl.$^5$ .............................. B60G 11/26
[52] U.S. Cl. .................. 280/707; 364/424.05
[58] Field of Search ............... 280/707, 772; 364/424.05

[56] References Cited

U.S. PATENT DOCUMENTS

| | | |
|---|---|---|
| 3,516,683 | 6/1970 | Capgras . |
| 3,550,993 | 12/1970 | Peiffer . |
| 4,483,409 | 11/1984 | Fun . |
| 4,625,993 | 12/1986 | Williams et al. . |
| 4,685,698 | 8/1987 | Klinkner et al. . |
| 4,743,046 | 5/1988 | Schmittger . |
| 4,787,649 | 11/1988 | Watanabe et al. ............ 280/707 |
| 4,825,370 | 4/1989 | Kurosawa ............ 364/424.05 |
| 4,999,777 | 3/1991 | Schussler et al. ........ 364/424.05 |
| 5,015,009 | 5/1991 | Ohyama et al. ............ 280/707 |

FOREIGN PATENT DOCUMENTS 0371709  6/1990  European Pat. Off. .

Primary Examiner—H. Grant Skaggs
Attorney, Agent, or Firm—Tarolli, Sundheim & Covell

[57] ABSTRACT

An active suspension system for a vehicle having a sprung mass and an unsprung mass comprises a hydraulic actuator connected between the sprung mass and the unsprung mass, and a hydraulic accumulator. An energy saving valve communicates the accumulator with the actuator to effect energy saving flows of hydraulic fluid in the actuator. The system provides a nominal hydraulic fluid pressure differential acting across a piston in the actuator when the actuator is in a nominal operating condition. The system responds to static load inputs to the vehicle by providing a load responsive pressure differential across the piston when the actuator is in a loaded condition. The load responsive pressure differential acts on the piston equally and oppositely to the static load input. The system maintains the hydraulic fluid pressure in the first hydraulic chamber equal to a nominal pressure level when the actuator is in a loaded condition. The nominal pressure level is equal to the mean operating pressure of the accumulator. The system thus maintains an optimum capacity for energy savings.

10 Claims, 2 Drawing Sheets

ACTIVE SUSPENSION SYSTEM

Technical Field

The present invention relates to active suspension systems for vehicles, and particularly relates to an active suspension system having energy saving features

BACKGROUND

U.S. Pat. No. 4,625,993 discloses an active suspension system for an automotive vehicle. The active suspension system operates between the sprung (wheels) and unsprung (chassis) masses of the vehicle. It achieves and maintains (with no vehicle operator inputs or responses) a desired attitude of the vehicle in response to static loading on the vehicle, and minimizes the motion, acceleration and vibration of the passenger compartment caused by road and vehicle dynamics to improve vehicle handling, reduce noise, improve ride, and improve stability. These features are achieved by controlling hydraulic suspension units located at the vehicle wheels.

The system comprises a hydraulic circuit, a plurality of sensors, and an electrical control system. The hydraulic circuit communicates a pump and a hydraulic reservoir with hydraulic actuators and valves at the suspension units. The sensors sense speed, acceleration, and inputs to the vehicle, and the electrical control system controls the flow of hydraulic fluid in the actuators and valves in response to the sensed inputs The suspension units in the active suspension system disclosed in the '993 patent each comprise a hydraulic actuator and a spring acting in parallel between a vehicle wheel and the vehicle chassis An electro-hydraulic servo valve associated with an actuator controls the flow of hydraulic fluid which effects movement of a piston in such actuator. Sensors at each suspension unit sense the load on the actuator, displacement between the wheel and the chassis, and acceleration of the wheel hub. Other sensors carried on the vehicle sense speed and acceleration of the vehicle.

The electrical control system responds to outputs from the sensors to provide displacement demand signals for each suspension unit so as to control static and dynamic displacement of the sprung and unsprung masses. The electrical control system also provides signals representing actual displacement for each suspension unit. The control system then compares the displacement demand signals with the actual displacement signals to produce error signals. Each servo valve in the hydraulic circuit is operated in accordance with the associated error signal to cause the actual displacement of the piston in the associated actuator to equal the desired displacement. The active suspension system thus controls the positions of the pistons to achieve a desired vehicle attitude by operating the servo valves.

The pump in the active suspension system disclosed in the '993 patent is driven by the vehicle engine. The hydraulic fluid power consumed at each suspension unit is equal to the product of the flow through the associated servo valve multiplied by the pressure provided by the pump. Energy is thus dissipated upon the flow of hydraulic fluid through the servo valves under pressure provided by the pump. Since the pump is driven by the vehicle engine, it is desirable to minimize energy dissipated by the active suspension system.

It is known that energy can be saved in an active suspension system by including hydraulic accumulators for effecting flows of hydraulic fluid in the actuators which would otherwise be effected by operating the servo valves. The accumulators store and dissipate energy which would otherwise be dissipated by flows of hydraulic fluid through the servo valves.

SUMMARY OF THE INVENTION

In accordance with the present invention, an active suspension system for a vehicle comprises an actuator connectable between the vehicle chassis and a wheel hub. A piston defines first and second variable volume hydraulic fluid chambers in the actuator on opposite sides of the piston. The piston is movable in the actuator in response to a hydraulic fluid pressure differential acting across the piston, and in response to inputs to the vehicle moving the wheel hub relative to the chassis. The actuator has a nominal operating condition with the piston located in a nominal operating position, and with the hydraulic fluid pressure in the first hydraulic chamber at a nominal pressure level. The actuator assumes a loaded condition when a static load input to the vehicle urges the piston to move from its nominal operating position so as to decrease the volume in the first hydraulic chamber.

The active suspension system further comprises a hydraulic accumulator or attenuator, and hydraulic means for communicating the accumulator with the first hydraulic chamber to effect energy saving flows of hydraulic fluid between the accumulator and the first hydraulic chamber. The hydraulic means provides a nominal hydraulic fluid pressure differential across the piston in the actuator when the actuator is in the nominal operating condition. A sensing means senses inputs to the vehicle. A control means is responsive to the sensing means for providing a static load signal which is functionally related to a static load input urging the actuator into a loaded condition. The hydraulic means responds to the static load signal by providing a load responsive pressure differential across the piston when the actuator is in the loaded condition. The load responsive pressure differential acts on the piston equally and oppositely to the static load input. The hydraulic means maintains the hydraulic fluid pressure in the first hydraulic chamber at the nominal pressure level when the actuator is in a loaded condition.

In a preferred embodiment of the present invention, the nominal pressure level is equal to the mean operating pressure of the accumulator. The hydraulic fluid pressure in the first hydraulic chamber is thus maintained equal to the mean operating pressure of the accumulator. The capacity of the accumulator to effect an energy saving flow of hydraulic fluid in the actuator is optimum when the hydraulic fluid pressure in the accumulator is at its mean operating pressure. Moreover, the hydraulic fluid pressure in the accumulator is functionally related to the hydraulic fluid pressure in the first hydraulic chamber. The active suspension system in accordance with the invention therefore has an optimum capacity for energy savings because the hydraulic fluid pressure in the first hydraulic chamber is maintained equal to the nominal pressure level, and is thus maintained equal to the mean operating pressure of the accumulator.

BRIEF DESCRIPTION OF THE DRAWINGS

The foregoing and other features of the present invention will become apparent to those skilled in the art upon reading the following description of preferred embodiments of the invention in view of the accompanying drawings, wherein.

DESCRIPTION OF PREFERRED EMBODIMENT

Figure 1:
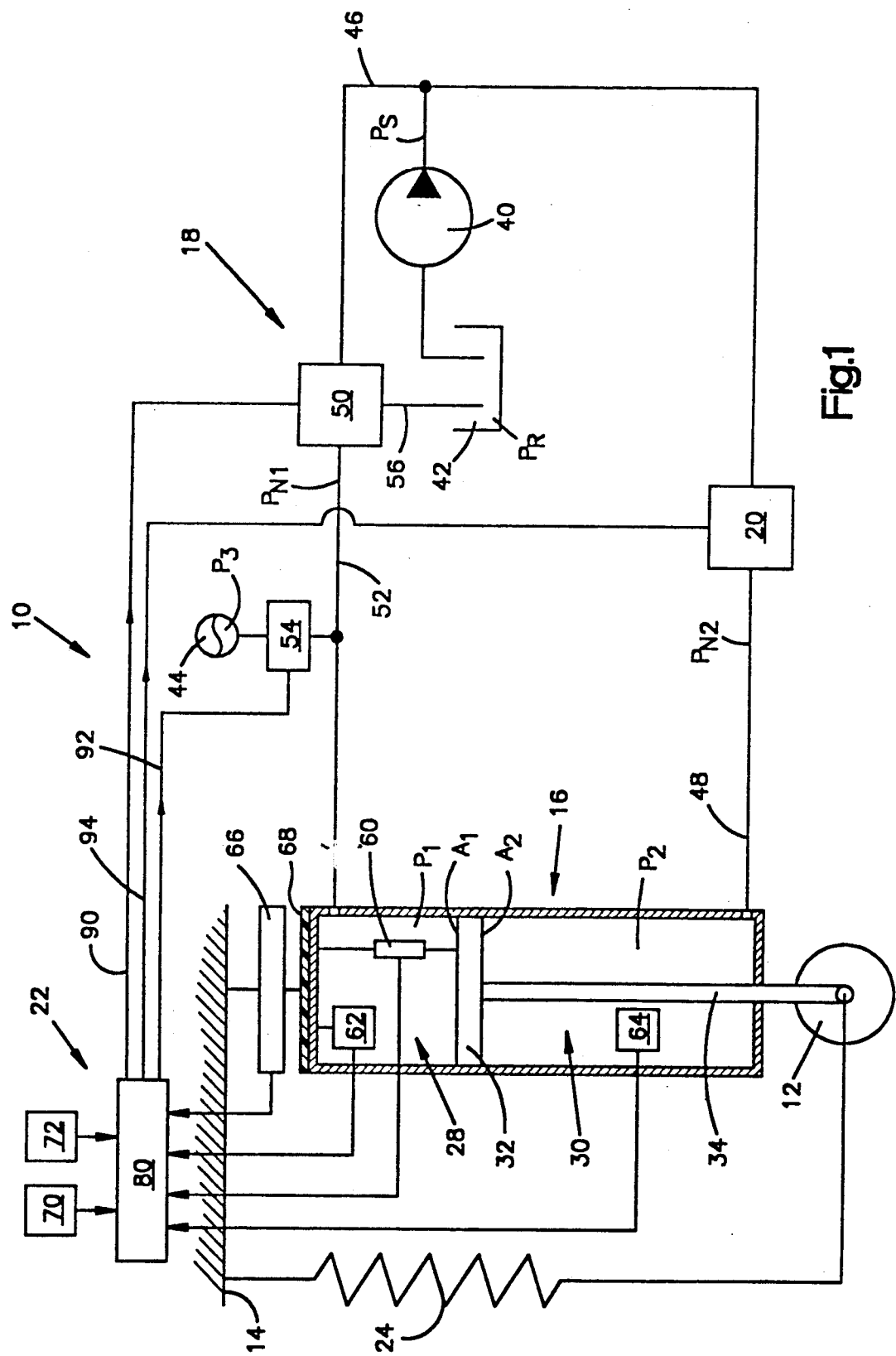
FIG. 1 is a schematic view of an active suspension system for a vehicle in accordance with a preferred embodiment of the present invention; an FIG. 2 is a schematic view of an active suspension system for a vehicle in accordance with an alternate embodiment of the present invention.

As shown schematically in FIG. 1, an active suspension system 10 in accordance with a preferred embodiment of the present invention is installed in a vehicle having a wheel hub 12, i.e., an unsprung mass, and a vehicle chassis 14, i.e., a sprung mass. The vehicle has four wheeled corners. For the purpose of explanation, the active suspension system 10 is described in detail with reference to only one corner of the vehicle, it being understood that the active suspension system 10 is associated with the other three corners of the vehicle in a similar manner. The active suspension system 10 comprises a double-acting hydraulic actuator 16, a hydraulic circuit 18 including a nominal pressure controller 20, and an electrical control system 22. Preferably, the nominal pressure controller 20 is an electro-hydraulic servo valve.

The actuator 16 and a spring 24 are connected in parallel between the wheel hub 12 and the chassis 14. Upper and lower variable volume hydraulic chambers 28 and 30 are defined in the actuator 16 on opposite sides of a movable piston 32. A piston rod 34 connects the piston 32 to the wheel hub 12.

The actuator 16 is an unequal area actuator, as shown in FIG. 1. The surface area $A_1$ of the piston 32 facing the upper hydraulic chamber 28 is greater than the surface area $A_2$ of the piston 32 facing the lower hydraulic chamber 30. Preferably, the unequal area ratio of $A_1$ to $A_2$ is 2:1. For the actuator 16 to maintain a zero force between the wheel hub 12 and the chassis 14, the hydraulic fluid pressure $P_1$ in the upper chamber 28 must be less than the hydraulic fluid pressure $P_2$ in the lower chamber 30 so as to define a pressure ratio of $P_1$ to $P_2$ which is the reciprocal of the unequal area ratio.

The hydraulic circuit 18 also includes a pump 40, a hydraulic fluid reservoir 42, and an accumulator 44. The pump 40 communicates with the lower chamber 30 in the actuator 16 through the nominal pressure controller 20 and hydraulic lines 46 and 48. The pump 40 and the reservoir 42 communicate with the upper chamber 28 in the actuator 16 through an electro-hydraulic servo control valve 50 and a hydraulic line 52. The accumulator 44 communicates with the upper chamber 28 through an energy saving electro-hydraulic servo valve 54 and the hydraulic line 52. The pump 40 provides a constant system pressure $P_s$ in the hydraulic line 46. The reservoir 42 and a hydraulic return line 56 are at a reservoir pressure $P_R$. The accumulator 44 has a mean operating pressure, and at any particular time is at a hydraulic fluid pressure $P_3$.

The active suspension system 10 further comprises a plurality of sensors for sensing various inputs to the vehicle such as load, acceleration, displacement, impact and vibration inputs. A position sensor, preferably a linear variable displacement transformer (LVDT) 60 senses displacement of the piston 32 within the actuator 16 and, in turn, displacement of the wheel hub 12 relative to the chassis 14. A first pressure transducer 62 in the actuator 16 senses the hydraulic fluid pressure $P_1$ in the upper chamber 28, and a second pressure transducer 64 in the actuator 16 senses the hydraulic fluid pressure $P_2$ in the lower chamber 30. A load cell 66 is operatively connected between the chassis 14 and the actuator 16 to sense the load on the actuator 16. A compliant rubber isolator 68 filters out insignificant variations in the load sensed by the load cell 66. The sensors further include a vehicle speed sensor 70 and one or more vehicle acceleration sensors 72, and may further include a steering angle sensor, or the like. The outputs of the sensors are electrical signals representing inputs to the vehicle urging the wheel hub 12 and the piston 32 to move relative to the chassis 14.

The electrical control system 22 comprises a controller 80 which receives the signals from the sensors representing inputs to the vehicle. In response to such signals, the controller 80 provides outputs on electrical lines 90, 92 and 94 which are control signals for operating the control valve 50, the nominal pressure controller 20, and the energy saving valve 54, respectively.

The suspension control system 10 has a nominal operating condition in which the spring 24 bears the load applied between the chassis 14 and the wheel hub 12 by the dead weight of the vehicle. When the active suspension system 10 is in the nominal operating condition, the load cell 66 senses a nominal load condition between the chassis 14 and the actuator 16. The controller 80 responds to the nominal load condition sensed by the load cell 66 by directing the control valve 50 to maintain the hydraulic fluid pressure in the hydraulic line 52 at a first nominal operating pressure $P_{N1}$. The pressure $P_1$ in the upper chamber 28 in the actuator 16 is thus maintained at the first nominal operating pressure $P_{N1}$ when the active suspension system 10 is in the nominal operating condition. The first nominal operating pressure $P_{N1}$ is less than the system pressure $P_s$ maintained in the hydraulic line 46 by the pump 40.

Simultaneously, the controller 80 directs the nominal pressure controller 20 to maintain the hydraulic fluid pressure in the hydraulic line 48 at a second nominal operating pressure $P_{N2}$ which is less than the system pressure $P_s$. The pressure $P_2$ in the lower chamber 30 is thus maintained at the second nominal operating pressure $P_{N2}$ when the active suspension system 10 is in the nominal operating condition. The first nominal operating pressure $P_{N1}$ is less than the second nominal operating pressure $P_{N2}$ so as to define a nominal operating pressure ratio of $P_{N1}$ to $P_{N2}$ which is the reciprocal of the unequal area ratio of $A_1$ to $A_2$. The piston 32 is thus maintained at the nominal operating position shown in FIG. 1 when the active suspension system 10 is in the nominal operating condition.

The active suspension system 10 operates to maintain a desired attitude of the vehicle when dynamic inputs to the vehicle urge the wheel hub 12 to move relative to the chassis 14. In a known manner, the controller 80 receives signals from the sensors representing such dynamic inputs to the vehicle, and provides a demand signal which is a function of such dynamic inputs. The demand signal provided by the controller 80 represents a desired motion, or resistance to motion, of the piston 32 in the actuator 16 to obtain a desired motion or resistance to motion of the wheel hub 12 relative to the chassis 14. The demand signal could be a velocity demand signal, a displacement demand signal, or a demand signal that minimizes load errors, as such demand signals are known in the art.

Dynamic inputs to the vehicle can be characterized as either load aiding or load opposing If a demand signal requests the piston 32 to move in a direction opposite to the direction in which a dynamic input urges the piston 32 to move, or if the demand signal requests the piston 32 to move at a velocity greater than the velocity at which the dynamic input urges the piston 32 to move, the dynamic input can be characterized as a load opposing input. If the demand signal and a dynamic input urge the piston 32 to move in the same direction at the same speed, the dynamic input can be characterized as a load aiding input. Static inputs to the vehicle are always load opposing.

Load aiding and load opposing inputs, as sensed by the various sensors, are identified by the controller 80 in a known manner. When the controller 80 identifies a load opposing dynamic input to the vehicle, the demand signal is provided by the controller 80 as an output signal on the electrical line 90 for operating the control valve 50. If the demand signal requests the piston 32 to move upward in the actuator 16, the control valve 50 communicates the hydraulic line 52 with the hydraulic return line 56 and the reservoir 42. Hydraulic fluid then flows out of the upper chamber 28 to effect upward movement of the piston 32. If the demand signal requests the piston 32 to move downward in the actuator 16, the control valve 50 communicates the hydraulic line 52 with the hydraulic line 46 and the pump 40. Hydraulic fluid then flows into the upper chamber 28 to effect downward movement of the piston 32.

When the controller 80 identifies a load aiding dynamic input to the vehicle, the controller 80 and the accumulator 44 operate to save energy in the active suspension system 10. If the load aiding input urges the piston 32 to move upward in the actuator 16 so as to reduce the volume of the upper chamber 28, the controller 80 provides an output signal on the electrical line 94 which is functionally related to the load aiding input. The output signal directs the energy saving valve 54 to communicate the accumulator 44 with the upper chamber 28. Hydraulic fluid then flows into the accumulator 44 and out of the upper chamber 28 as the load aiding input to the vehicle moves the piston 32 upward in the actuator 16. Energy is then stored in the accumulator 44. Because the input to the vehicle is load aiding. such upward movement of the piston 32 occurs in the desired amount requested by the demand signal. To the extent that the accumulator 44 has the capacity to receive the resulting flow of hydraulic fluid, movement of the piston 32 as requested by the demand signal is effected without using the control valve 50 to direct a corresponding flow of hydraulic fluid toward the reservoir 42. Energy which would otherwise be dissipated by a flow of hydraulic fluid to the reservoir 42 is thus saved and stored in the accumulator 44.

If a load aiding input to the vehicle urges the piston 32 to move downward in the actuator 16 so as to increase the volume of the upper chamber 28, the output signal provided by the controller 80 on the electrical line 94 directs the energy saving valve 54 to communicate the accumulator 44 with the upper chamber 28. Hydraulic fluid then flows out of the accumulator 44 and into the upper chamber 28 as the piston 32 moves downward. Energy stored in the accumulator 44 is then dissipated. Because the input to the vehicle is load aiding. such downward movement of the piston 32 occurs in the desired amount requested by the demand signal. To the extent that the accumulator 44 contains hydraulic fluid under pressure which it can discharge for a flow of hydraulic fluid into the upper chamber 28, such downward movement of the piston 32 is effected without using the control valve 50 to communicate the pump 40 with the upper chamber 28. Energy which would otherwise be dissipated upon a flow of hydraulic fluid through the control valve 50 under pressure provided by the pump 40 is thus saved by using the accumulator 44 as described.

The capacity of the accumulator 44 to receive or discharge pressurized hydraulic fluid for energy savings a any particular time is related to the hydraulic fluid pressure $P_3$ in the accumulator 44 at that time, and is optimum when the accumulator 44 is at its mean operating pressure. The hydraulic fluid pressure $P_3$ in the accumulator varies in functional relationship to the hydraulic fluid pressure $P_1$ in the upper chamber 28 when the energy saving valve 54 communicates the accumulator 44 with the upper chamber 28. Consequently, the energy saving capability of the active suspension system 10 is functionally related to the hydraulic fluid pressure $P_1$ in the upper chamber 28, and is optimum when the pressure $P_1$ equals the mean operating pressure of the accumulator 44. The accumulator 44 is sized to have a mean operating pressure equal to the first nominal operating pressure $P_{N1}$.

The active suspension system 10 also operates to maintain a desired displacement of the wheel hub 12 relative to the chassis 14 in response to static inputs to the vehicle. As described above, the active suspension system 10 has a nominal operating condition in which the spring 24 bears the load applied between the chassis 14 and the wheel hub 12 by the dead weight of the vehicle. The controller 80 then identifies a nominal load condition at the load cell 66, and provides an output signal on the electrical line 92 directing the nominal pressure controller 20 to maintain the hydraulic fluid pressure in the hydraulic line 48 at the second nominal operating pressure $P_{N2}$. The pressure $P_2$ in the lower chamber 30 is thus maintained at the second nominal operating pressure $P_{N2}$, and the pressure ratio of $P_1$ to $P_2$ equals the nominal operating pressure ratio of $P_{N1}$ to $P_{N2}$.

When a static load input to the vehicle urges the wheel hub 12 to move upward relative to the chassis 14, and consequently urges the piston 32 to move upward in the actuator 16, the pressure differential defined by the nominal operating pressure ratio of $P_{N1}$ to $P_{N2}$ will no longer maintain the piston 32 in its nominal operating position. The controller 80 then identifies a static loading condition, and provides an output signal on the electrical line 92 which is functionally related to the static load input to the vehicle. The output signal directs the nominal pressure controller 20 to reduce the hydraulic fluid pressure in the hydraulic line 48 to a level below the second nominal operating pressure $P_{N2}$. The hydraulic fluid pressure $P_2$ in the lower chamber 30 is thus reduced to a level below the level of the second nominal operating pressure $P_{N2}$. As a result, the pressure ratio of $P_1$ to $P_2$ is increased above the nominal operating pressure ratio of $P_{N1}$ to $P_{N2}$. The increased pressure ratio is determined by the controller 80 so as to establish a load responsive pressure differential which acts on the piston 32 equally and oppositely to the static load input to the vehicle. The piston 32 is thus maintained in its nominal operating position without increasing the hydraulic fluid pressure $P_1$ in the upper chamber 28 above the first nominal operating pressure $P_{N1}$. Because the hydraulic fluid pressure $P_1$ in the upper chamber 28 remains equal to $P_{N1}$, the hydraulic fluid pressure $P_3$ in the accumulator 44 likewise remains equal to $P_{N1}$, which is the mean operating pressure of the accumulator 44. The full capacity of the accumulator 44 is therefore preserved for energy savings.

Figure 2:
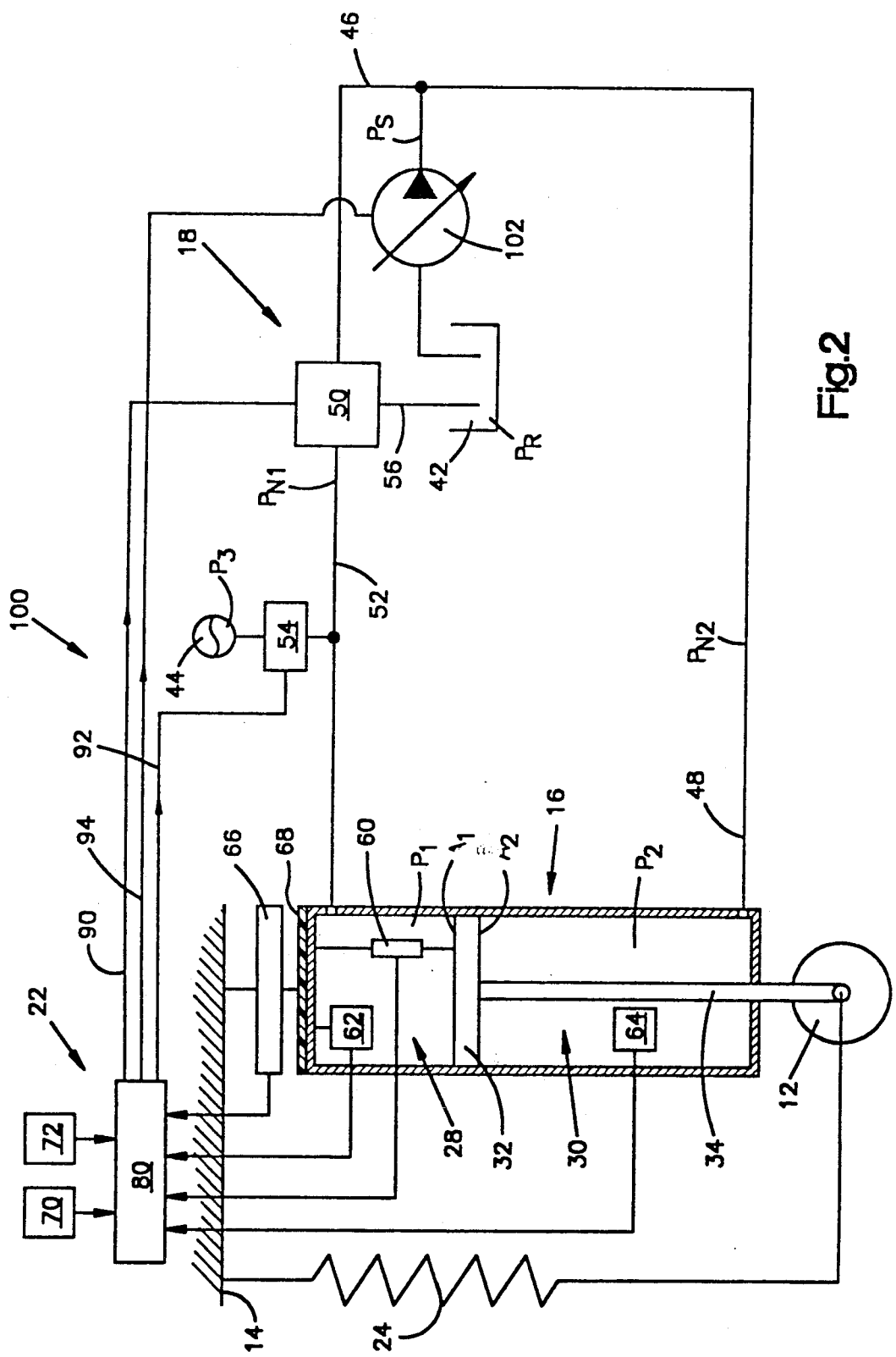

In an alternate embodiment of the invention shown in FIG. 2, an active suspension system 100 includes a variable pressure pump 102 in place of the pump 40 and the nominal pressure controller 20 in the active suspension system 10 shown in FIG. 1. The other elements of the active suspension system 100 shown in FIG. 2 are the same as those shown in FIG. 1, and have the same reference numbers. The variable pressure pump 102 communicates directly with the lower chamber 30 in the actuator 16, and provides a variable system pressure $P_s$ in functional relationship to an output signal provided on the electrical line 92 by the controller 80. The output signal is functionally related to a static load input identified by the controller 80. The hydraulic fluid pressure $P_2$ in the lower chamber 30 is thus varied to provide a load responsive pressure differential acting on the piston 32 equally and oppositely to the static load input in accordance with the invention.

From the above description of the invention, those skilled in the art will perceive improvements, changes and modifications. Such improvements, changes and modifications are intended to be covered by the appended claims.

Having described the invention, the following is claimed:

1. An active suspension system for a vehicle having a sprung mass and an unsprung mass, said active suspension system comprising:

an actuator connectable between the sprung mass and the unsprung mass, said actuator comprising first and second variable volume hydraulic fluid chambers on opposite sides of a piston, said piston being movable in said actuator in response to a hydraulic fluid pressure differential acting across said piston, and in response to inputs to the vehicle moving the sprung mass relative to the unsprung mass;

said actuator having a nominal operating condition with said piston located in a nominal operating position, and with the hydraulic fluid pressure in said first hydraulic chamber at a nominal pressure level, said actuator assuming a loaded condition when a static load input to the vehicle urges said piston to move from said nominal operating position so as to decrease the volume in said first hydraulic chamber;

a hydraulic accumulator;

hydraulic means including means for communicating said accumulator with said first hydraulic chamber;

sensing means for sensing inputs to the vehicle urging the sprung mass to move relative to the unsprung mass;

control means responsive to said sensing means for providing a static load signal which is functionally related to said static load input;

said hydraulic means providing a nominal hydraulic fluid pressure differential across said piston when said actuator is in said nominal operating condition, and being responsive to said static load signal for providing a load responsive pressure differential across said piston when said actuator is in said loaded condition, said load responsive pressure differential acting on said piston equally and oppositely to said static load input;

said hydraulic means maintaining the hydraulic fluid pressure in said first hydraulic chamber equal to said nominal pressure level when said actuator is in said loaded condition; and said actuator having a mean operating pressure, said nominal pressure level being equal to said mean operating pressure.

2. A system as defined in claim 1 wherein said hydraulic means varies the hydraulic fluid pressure in said second hydraulic chamber while the hydraulic fluid pressure in said first hydraulic chamber is maintained at said nominal pressure level.

3. A system as defined in claim 2 wherein said hydraulic means comprises a source of pressurized hydraulic fluid and a pressure regulating valve communicating said source with said second hydraulic chamber, said pressure regulating valve being responsive to said static load signal for varying the hydraulic fluid pressure in said second hydraulic chamber while the hydraulic fluid pressure in said first hydraulic chamber is maintained at said nominal pressure level.

4. A system as defined in claim 3 wherein said pressure regulating valve varies the hydraulic fluid pressure in said second hydraulic chamber within a range of pressure levels greater than said nominal pressure level.

5. A system as defined in claim 4 wherein said control means is responsive to said sensing means for providing a first dynamic load signal which is functionally related to a load opposing dynamic input to the vehicle, and for providing a second dynamic load signal which is functionally related to a load aiding dynamic input to the vehicle, said hydraulic means including a control valve for communicating said first hydraulic chamber with said source of pressurized hydraulic fluid or with a hydraulic reservoir in response to said first dynamic load signal, and including an energy saving valve for communicating said first hydraulic chamber with said accumulator in response to said second dynamic load signal.

6. A suspension control system for a vehicle having a sprung mass and unsprung mass, said suspension control system comprising:

an actuator connectable between the sprung mass and the unsprung mass, said actuator comprising first and second variable volume hydraulic fluid chambers on opposite sides of a piston, the surface area of said piston facing said first hydraulic chamber being greater than the surface area of said piston facing said second hydraulic chamber, said surface areas defining an unequal area ratio;

said piston being movable in said actuator in response to a hydraulic fluid pressure differential acting across said piston, and in response to inputs to the vehicle moving the sprung mass relative to the unsprung mass;

spring means operative between the sprung mass and the unsprung mass for establishing a nominal operating displacement of the sprung mass relative to the unsprung mass, and for establishing a nominal operating position of said piston in said actuator;

a hydraulic accumulator;

hydraulic means for providing hydraulic fluid at a first nominal operating pressure in said first hydraulic chamber, and for providing hydraulic fluid at a second nominal operating pressure in said second hydraulic chamber, said nominal operating pressures defining a pressure ratio which is the reciprocal of said unequal area ratio;

said hydraulic means including means for communicating said accumulator with said first hydraulic chamber;

sensing means for sensing inputs to the vehicle urging the sprung mass to move relative to the unsprung mass;

control means responsive to said sensing means, said control means including means for identifying a static load input which urges said piston to move from said nominal operating position so as to decrease the volume of said first hydraulic chamber;

said control means including means for decreasing the pressure of hydraulic fluid in said second hydraulic chamber from said second nominal operating pressure to a load responsive pressure in response to said static load input, said load responsive pressure and said first nominal operating pressure establishing a pressure differential across said piston which acts on said piston equally and oppositely to said static load input; and said accumulator having a mean operating pressure, said first nominal operating pressure being equal to said mean operating pressure.

7. A system as defined in claim 6 wherein said hydraulic means comprises a source of pressurized hydraulic fluid, said control means comprising a pressure regulating valve communicating said source with said second hydraulic chamber, said pressure regulating valve varying the pressure of hydraulic fluid in said second hydraulic chamber within a range of pressure levels greater than said first nominal operating pressure.

8. A system as defined in claim 7 wherein said control means is responsive to said sensing means for providing a first dynamic load signal which is functionally related to a load opposing dynamic input to the vehicle, and for providing a second dynamic load signal which is functionally related to a load aiding dynamic input to the vehicle, said hydraulic means including a control valve for communicating said first hydraulic chamber with said source of pressurized hydraulic fluid or with a hydraulic reservoir in response to said first dynamic load signal, and an energy saving valve for communicating said first hydraulic chamber with said accumulator in response to said second dynamic load signal.

9. A suspension control system for a vehicle having a sprung mass and an unsprung mass, said suspension control system comprising:

an actuator connectable between the sprung mass and the unsprung mass, said actuator comprising first and second variable volume hydraulic fluid chambers on opposite sides of a piston, the surface area of said piston facing said first hydraulic chamber being greater than the surface area of said piston facing said second hydraulic chamber, said surface areas defining an unequal area ratio;

said piston being movable in said actuator in response to a hydraulic fluid pressure differential acting across said piston, and in response to inputs to the vehicle moving the sprung mass relative to the unsprung mass;

spring means operative between the sprung mass and the unsprung mass for establishing a nominal operating displacement of the sprung mass relative to the unsprung mass, and for establishing a nominal operating position of said piston in said actuator;

a hydraulic accumulator;

hydraulic means for providing hydraulic fluid at a first nominal operating pressure in said first hydraulic chamber, and for providing hydraulic fluid at a second nominal operating pressure in said second hydraulic chamber, said nominal operating pressure being less than said second nominal operating pressure, said nominal operating pressures defining a pressure ratio which is the reciprocal of said unequal area ratio;

sensing means for sensing inputs to the vehicle urging the sprung mass to move relative to the unsprung mass;

control means responsive to said sensing means, said control means including means for identifying a static load input which urges said piston to move from said nominal operating position so as to decrease the volume of said first hydraulic chamber; and said control means including means for decreasing the pressure of hydraulic fluid in said second hydraulic chamber from said second nominal operating pressure to a load responsive pressure in response to said static load input, and for simultaneously maintaining said hydraulic fluid in said first hydraulic chamber at said first nominal operating pressure, said load responsive pressure and said first nominal operating pressure establishing a pressure differential across said piston which acts on said piston equally and oppositely to said static load input.

10. An active suspension system for a vehicle having a sprung mass and an unsprung mass, said active suspension system comprising:

an actuator connectable between the sprung mass and the unsprung mass, said actuator comprising first and second variable volume hydraulic fluid chambers on opposite sides of a piston, said piston being movable in said actuator in response to a hydraulic fluid pressure differential acting across said piston, and in response to inputs to the vehicle moving the sprung mass relative to the unsprung mass;

said actuator having a nominal operating condition with said piston located in a nominal operating position, and with the hydraulic fluid pressure in said first hydraulic chamber at a nominal pressure level, said actuator assuming a loaded condition when a static load input to the vehicle urges said piston to move from said nominal operating position so as to decrease the volume in said first hydraulic chamber;

a hydraulic accumulator;

hydraulic means including means for communicating said accumulator with said first hydraulic chamber;

sensing means for sensing inputs to the vehicle urging the sprung mass to move relative to the unsprung mass;

control means responsive to said sensing means for providing a static load signal which is functionally related to said static load input;

said hydraulic means providing a nominal hydraulic fluid pressure differential across said piston when said actuator is in said nominal operating condition, and being responsive to said static load signal for providing a load responsive pressure differential across said piston when said actuator is in said loaded condition, said load responsive pressure differential acting on said piston equally and oppositely to said static load input;

said hydraulic means changing the hydraulic fluid pressure differential across said piston from said nominal pressure differential to said load responsive pressure differential by decreasing the hydraulic fluid pressure in said second hydraulic chamber while maintaining the hydraulic fluid pressure in said first hydraulic chamber equal to said nominal pressure level.

* * * * *

UNITED STATES PATENT AND TRADEMARK OFFICE
CERTIFICATE OF CORRECTION

PATENT NO. : 5,137,299

DATED : August 11, 1992

INVENTOR(S) : Neil Jones

It is certified that error appears in the above-identified patent and that said Letters Patent is hereby corrected as shown below:

Column 10, Line 5, Claim 9, before "nominal" insert --first--.

Column 10, Line 10, Claim 9, insert new paragraph --said hydraulic means including means for communicating said accumulator with said first hydraulic chamber--.

Column 10. Line 68, Claim 10, after "input" insert --and--.

Signed and Sealed this

Seventh Day of September, 1993

Attest:

BRUCE LEHMAN

*Attesting Officer*   *Commissioner of Patents and Trademarks*